US011237295B1

(12) United States Patent
Katterbauer et al.

(10) Patent No.: US 11,237,295 B1
(45) Date of Patent: Feb. 1, 2022

(54) METHOD FOR INTELLIGENT AUTOMATIC ROCK FRAGMENTS DEPTH DETERMINATION WHILE DRILLING

(71) Applicant: SAUDI ARABIAN OIL COMPANY, Dhahran (SA)

(72) Inventors: Klemens Katterbauer, Dhahran (SA); Alberto Marsala, Venice (IT); Nouf Jabri, Dhahran (SA); Shitong Sherry Zhu, Waban, MA (US); Martin E. Poitzsch, Northumberland, NH (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/069,063

(22) Filed: Oct. 13, 2020

(51) Int. Cl.
| | |
|---|---|
| *G01V 9/00* | (2006.01) |
| *E21B 49/00* | (2006.01) |
| *E21B 47/04* | (2012.01) |
| *G01V 99/00* | (2009.01) |
| *G05B 19/401* | (2006.01) |

(Continued)

(52) U.S. Cl.
CPC ............ *G01V 9/00* (2013.01); *E21B 47/04* (2013.01); *E21B 49/005* (2013.01); *G01V 99/005* (2013.01); *G05B 19/401* (2013.01); *G06N 20/00* (2019.01); *G05B 2219/45129* (2013.01); *G06F 30/20* (2020.01); *G06F 2113/08* (2020.01)

(58) Field of Classification Search
USPC .......................................................... 702/9
See application file for complete search history.

(56) References Cited

U.S. PATENT DOCUMENTS

| 6,840,316 B2 | 1/2005 | Stegemeier et al. |
| 8,172,007 B2 | 5/2012 | Dolman et al. |

(Continued)

FOREIGN PATENT DOCUMENTS

| CN | 110965991 A | 4/2020 |
| WO | 2012115717 A2 | 8/2012 |

(Continued)

OTHER PUBLICATIONS

Poitzsch, Martin E. et al., "IPTC-19785 Nanoparticle Tags for Improved Depth Correlation", Saudi Aramco, International Petroleum Technology Conference 2020, Jan. 2020 (15 pages).

*Primary Examiner* — Paul D Lee
(74) *Attorney, Agent, or Firm* — Osha Bergman Watanabe & Burton LLP

(57) ABSTRACT

A method for depth determination of drilled rock cuttings is disclosed. The taggant is injected and transported downhole along the mud stream and attaches to the rock cuttings. Taggant impregnated cuttings are detected at the surface based on molecular weight, emission wavelengths or radio frequency characteristics for encoding the taggant. The identification code identifies the depth of the drill bit when the particular batch of the taggant is released into the mud. The detection data, in addition to mud properties, flow rates, drill volume and penetration rates, formation characteristics, and well specifications are transferred to and analyzed by a taggant analysis and control engine. The taggant analysis and control engine controls an IoT controller that adapts the parameters of the taggant injection pump to achieve an intelligent controlled release to optimize the depth characterization process.

20 Claims, 5 Drawing Sheets

(51) Int. Cl.
    *G06N 20/00*     (2019.01)
    *G06F 30/20*     (2020.01)
    *G06F 113/08*     (2020.01)

(56) References Cited

U.S. PATENT DOCUMENTS

| | | |
|---|---|---|
| 8,610,431 B2 | 12/2013 | Chen et al. |
| 8,627,902 B2 | 1/2014 | Hammer et al. |
| 2004/0129874 A1* | 7/2004 | Torgersen ............... G01N 33/18 250/255 |
| 2009/0087911 A1 | 4/2009 | Ramos |
| 2009/0087912 A1 | 4/2009 | Ramos et al. |
| 2010/0015612 A1 | 1/2010 | Pelham et al. |
| 2012/0175511 A1* | 7/2012 | Masnyk .................. E21B 43/26 250/259 |
| 2012/0178653 A1 | 7/2012 | McClung, III |
| 2016/0146002 A1 | 5/2016 | Walls et al. |
| 2019/0360326 A1 | 11/2019 | Deville et al. |
| 2019/0368336 A1 | 12/2019 | Hammond |
| 2020/0116019 A1 | 4/2020 | Ow et al. |

FOREIGN PATENT DOCUMENTS

| | | |
|---|---|---|
| WO | 2016016335 A1 | 2/2016 |
| WO | 2020014300 A1 | 1/2020 |
| WO | 2020089587 A1 | 5/2020 |

\* cited by examiner

METHOD FOR INTELLIGENT AUTOMATIC ROCK FRAGMENTS DEPTH DETERMINATION WHILE DRILLING

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" are rock fragments generated by the drill bit as the drill bit advances along the borehole. Mud logging is the creation of a well log of a borehole by examining the rock cuttings brought to the surface by the circulating drilling mud.

A taggant is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant includes the metallic NanoTag, which is a microscopic, metallic tag, e.g., between 0.3 and 1.0 millimeters. Each batch of Nano-Tags has a unique multi-digit alphanumeric identification code. For example, the identification code may be etched into an optically variable (holographic) substrate of the NanoTag. The NanoTags may be suspended in a UV sensitive clear adhesive which is either brushed or sprayed onto any item for authentication or other security purposes.

SUMMARY

In general, in one aspect, the invention relates to a method for rock cutting depth determination during a drilling operation in a subterranean formation. The method includes releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit, detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings, releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit, detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings, analyzing, using a taggant analysis and control engine, an overlap of the first time-dependent signal and the second time-dependent signal with respect to injection parameters of the taggant injection pump during the first time period and the second time period to generate an injection profile, and adjusting, based on the injection profile, the injection parameters of the taggant injection pump to improve a quality of the rock cutting depth determination, wherein mud logging is performed based on an improved quality of the rock cutting depth determination.

In general, in one aspect, the invention relates to a system for rock cutting depth determination. The system includes a computer processor, and memory storing instructions. The instructions, when executed by the computer processor, include functionality for releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit, detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings, releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit, detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings, analyzing, using a taggant analysis and control engine, an overlap of the first time-dependent signal and the second time-dependent signal with respect to injection parameters of the taggant injection pump during the first time period and the second time period to generate an injection profile, and adjusting, based on the injection profile, the injection parameters of the taggant injection pump to improve a quality of the rock cutting depth determination, wherein mud logging is performed based on an improved quality of the rock cutting depth determination.

In general, in one aspect, the invention relates to a non-transitory computer readable medium storing instructions executable by a computer processor for rock cutting depth determination. The instructions, when executed, include functionality for releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit, detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings, releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit, detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings, analyzing, using a taggant analysis and control engine, an overlap of the first time-dependent signal and the second time-dependent signal with respect to injection parameters of the taggant injection pump during the first time period and the second time period to generate an injection profile, and adjusting, based on the injection profile, the injection parameters of the taggant injection pump to improve a quality of the rock cutting depth determination, wherein mud logging is performed based on an improved quality of the rock cutting depth determination.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
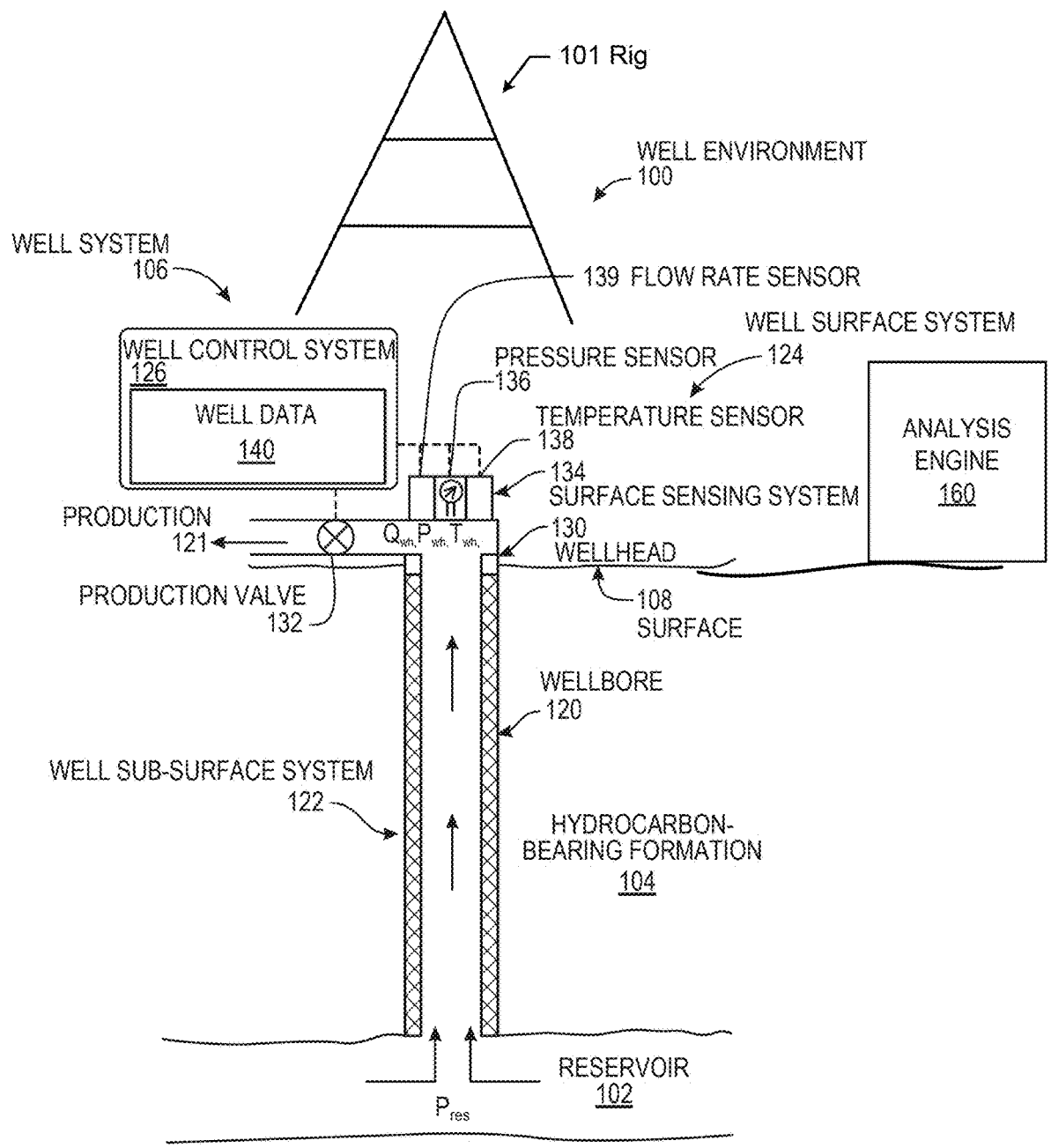
FIGS. 1 and 2 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium for depth determination of drilled rock cuttings based on impregnated taggant. In one or more embodiments of the invention, the taggant includes polymeric based nanoparticles that are encoded based on bar codes, or radio frequency characteristics. A taggant injection pump controls the release of the taggant into the drilling fluid in order to ensure that rock cuttings are distinguishable during various stages, and generated at different depths, of the drilling operation. The taggant is injected and transported downhole along the mud stream and attaches to the rock cuttings as the rock cuttings are produced at the drill bit. Subsequently, taggant impregnated cuttings are detected at the surface to generate detection data. The detection data includes the identification code of the taggant that is detected based on molecular weight, emission wavelengths or radio frequency characteristics for encoding the taggant. The identification code identifies the depth of the drill bit when the particular batch of the taggant is released into the mud. The detection data, in addition to mud properties, flow rates, drill volume and penetration rates, formation characteristics, and well specifications (e.g., depth, diameter, geometries, etc.) are transferred to and analyzed by the taggant analysis and control engine. The taggant analysis and control engine controls an Internet-of-Things (IoT) controller that adapts the parameters of the taggant injection pump to achieve an intelligent controlled release to optimize the depth characterization process.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments of the invention, the well system (106) includes a rig (101), a wellbore (120), a well subsurface system (122), a well surface system (124), and a well control system ("control system") (126). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of computer system (500) described below in FIGS. 5A and 5B and the accompanying description. For example, the taggant detector (201), the IoT controller (203), and the taggant injection pump (206) depicted in FIG. 2 below may be part of the well control system (126) and may be implemented as a combination of hardware and software components of the computer system (500).

The rig (101) is the machine used to drill a borehole to form the wellbore (120). Major components of the rig (101) include the drilling fluid tanks, the drilling fluid pumps (e.g., rig mixing pumps), the derrick or mast, the drawworks, the rotary table or topdrive, the drillstring, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates, drill volume and penetration rates, formation characteristics, etc. The well data (140) may also include sensor data of the taggant detector (201) depicted in FIG. 2 below. In some embodiments, the well data (140) are recorded in real-time, and are available for review or use within seconds, minutes or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling fluidflow, hook load, rotary speed, etc. Further, the taggant detector (201) depicted in FIG. 2 below may be included as part of the surface sensing system (134).

In some embodiments, the well system (106) is provide with an analysis engine (160). For example, the taggant analysis and control engine (202) depicted in FIG. 2 below may be part of the analysis engine (160) that includes hardware and/or software with functionality for analyzing the drilling fluid and taggant impregnated rock cuttings to determine the depth of the drill bit where the rocking cuttings are generated. The depth of the drill bit where the rocking cuttings are generated is referred to as the cuttings' depth of origin. Accurate determination of the cuttings' depth of origin for mud logging improves the quality in geosteering, well placement, and petrophysical analysis through real time formation evaluation. The analysis engine (160) may also include a reservoir simulator that includes hardware and/or software with functionality for generating one or more reservoir models regarding the hydrocarbon-bearing formation (104) and/or performing one or more reservoir simulations. The reservoir model and reservoir simulation may be advantageously generated/performed based on the aforementioned improved well placement and petrophysical analysis. Accordingly, the reservoir development planning and/or production operation are improved based on the result generated by the analysis engine (160).

While the analysis engine (160) is shown at a well site, in some embodiments, the analysis engine (160) are located away from well site, such as in the Cloud over the Internet. In some embodiments, the analysis engine (160) may include a computer system that is similar to the computer system (500) described below with regard to FIGS. 5A and 5B and the accompanying description.

Figure 2:
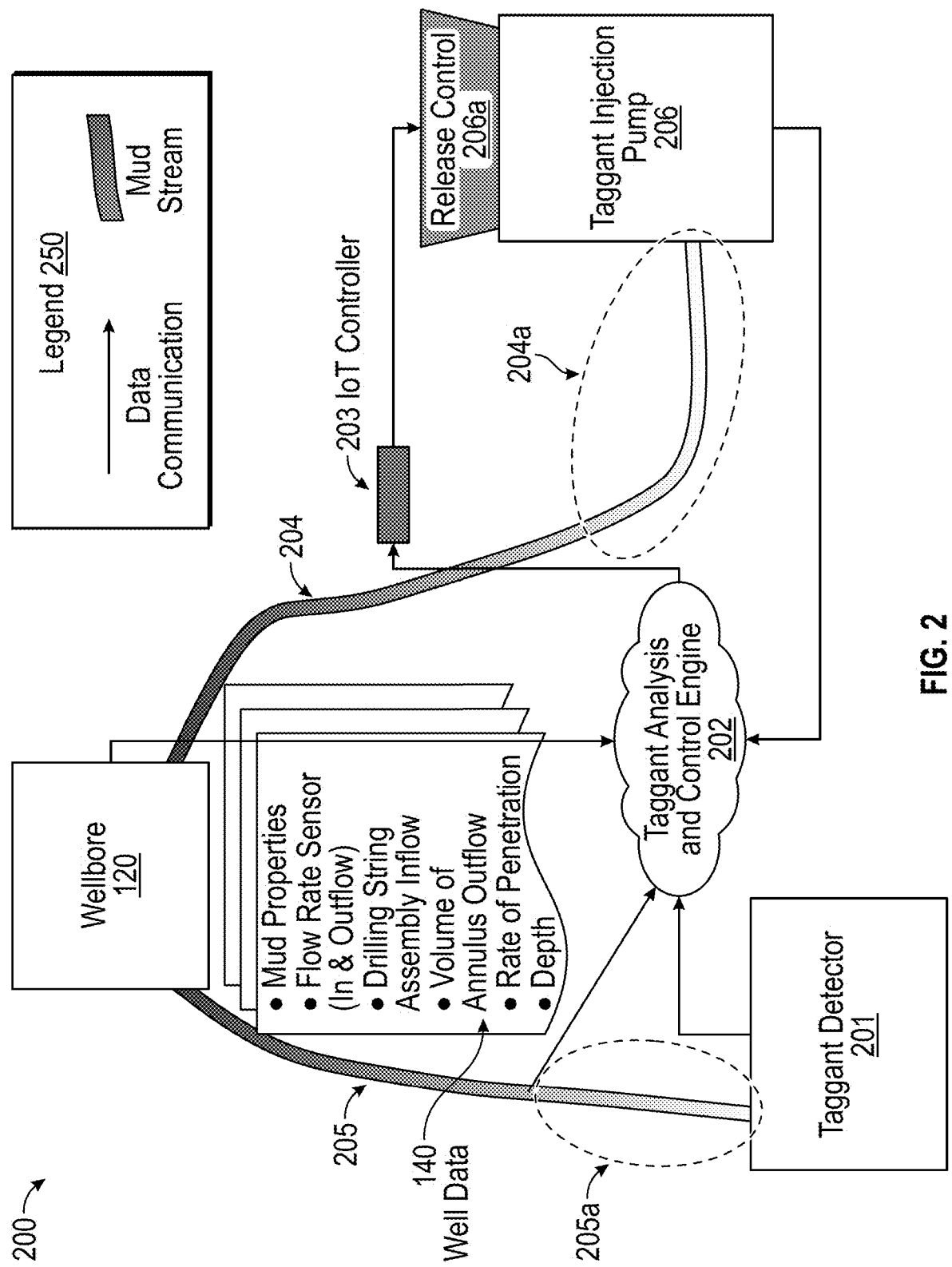

Turning to FIG. 2, FIG. 2 illustrates an example system in accordance with one or more embodiments of the invention. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

Lack of accurate determination of the cuttings' depth of origin limits the efficacy of conventional mud logging due to depth uncertainty of several feet (ft), especially in deviated and horizontal wells where cuttings' flows may be delayed due to gravitational debris accumulation, and problematic hydraulics and hole cleaning. Accurate determination of the cuttings' depth of origin depends on wellbore mud hydraulics, hole cleaning, accurate knowledge of the return-trip delay time up in the annulus, discrimination of cavings and potentially delayed cuttings returning to the surface, etc. Even in normal flow conditions, the depth uncertainties can reach more than 20 ft if the cuttings' upward trip lasts more than 30 minutes. Any inaccuracy in labeling of the collected cuttings further increases these errors.

FIG. 2 shows a system (200) for automatically and accurately determining, while drilling, the depth of origin of rock cuttings carried to the surface in the mud stream. In one or more embodiments of the invention, the system (200) is part of the well system (106) depicted in FIG. 1 above. As shown in FIG. 2, the system (200) includes a taggant detector (201), a taggant analysis and control engine (202), an IoT controller (203), and a taggant injection pump (206) that collectively detect, analyze, and control the taggant release into the mud stream (204, 205) of the wellbore (120). For example, the taggant detector (201), the IoT controller (203), and the taggant injection pump (206) may be part of the well control system (126) depicted in FIG. 1 above. The taggant analysis and control engine (202) may be part of the analysis engine (160) depicted in FIG. 1 above. As shown in FIG. 2 based on the legend (250), the arrows represent data communication among various components of the system (200), and the shaded curves represent the mud streams. In particular, the mud stream (204) travels downhole and the mud stream (205) returns to the surface. The lighter shaded portion (204a) of the mud stream (204) represents the taggant released into the mud stream traveling downhole. The lighter shaded portion (205a) of the mud stream (205) represents the taggant impregnated onto the rock cuttings carried by the mud stream returning to the surface. For example, the lighter shaded portion (205a) corresponds to a first batch of taggant released into the mud stream, while the lighter shaded portion (204a) of the mud stream (204) corresponds to a second batch of taggant that is released subsequent to the first batch. In this context, the lighter shaded portion (205a) is referred to as the taggant (205a) or the first batch of taggant. Similarly, the lighter shaded portion (204a) is referred to as the taggant (204a) or the second batch of taggant.

In one or more embodiments of the invention, the taggant detector (201) detects and analyzes the taggant impregnated on the rock cuttings as the rock are carried to the surface in the mud stream. The detection data, in addition to mud properties, flow rates, drill volume and penetration rates, formation nature, and well specifications (depth, diameter, geometries, etc.) are then transferred to the taggant analysis and control engine (202).

In one or more embodiments of the invention, the taggant analysis and control engine (202) analyzes the detection data and other information from the taggant detector (201) to generate injection profiles. The injection profiles is sent to and used by the IoT controller (203) to adapt the injection parameters of the taggant injection pump (206) for achieving an intelligent controlled release of the taggant. In one or more embodiments, the taggant analysis and control engine (202) generates injection profiles using artificial intelligence and machine learning algorithms.

In one or more embodiments of the invention, the IoT controller (203) controls the taggant injection pump (206), via the release control (206a), to release the taggant into the mud stream to ensure that different batches of taggant impregnated rock cuttings generated during various stages of the drilling operations are distinguishable. As noted above, the IoT controller (203) controls the taggant injection pump (206) by adapting the injection parameters based on the injection profiles received from the taggant analysis and control engine (202).

In one or more embodiments of the invention, the taggant injection pump (206) includes multiple injector valves connected to a number of different container chambers (for holding the taggant) with different sizes that are selectable based on the injection profiles. The IoT controller (203) interfaces with the taggant injection pump (206) to control both the degree of the shutting and opening of the injector valves for the respective chambers, as well as the pressure at the injector valves. The taggant injection pump (206) is a metering pump that allows exact amount of taggant to be injected into the drilling fluid. While the taggant injection pump (206) automatically adjusts the injector valves based on the injection parameters from the IoT controller (203), the taggant injection pump (206) also allows for manual adjustment of the injector valves.

In one or more embodiments of the invention, the taggant includes polymeric nanoparticles dispersed in an aqueous fluid, which is added in small doses directly into drilling fluids. The polymeric nanoparticles are one type of taggant referred to as "NanoTags." The term "NanoTags" may also refer to other types of taggant such as metal microdots with etched identification codes. Due to the small size and chemical nature of the NanoTags or polymeric nanoparticles, the taggant permanently attaches to rock cuttings as the rock cuttings are cut at the drill bit face. The taggant impregnates the rock cuttings by remaining on and embedded inside the pores of the rock cuttings as the rock cuttings return to the surface in the mud stream. Based on the encoded identification code of the NanoTags or polymeric nanoparticles, the depth determination of the taggant impregnated rock cuttings has a depth uncertainty within 1 ft and is not effected even if different batchs of rock cuttings are shifted or mixed up during transport of storage prior to being analyzed. Accordingly, the system (200) improves the quality of petrophysical analysis of the rock cuttings based on the improved depth accuracy of mud logging.

Figure 3:
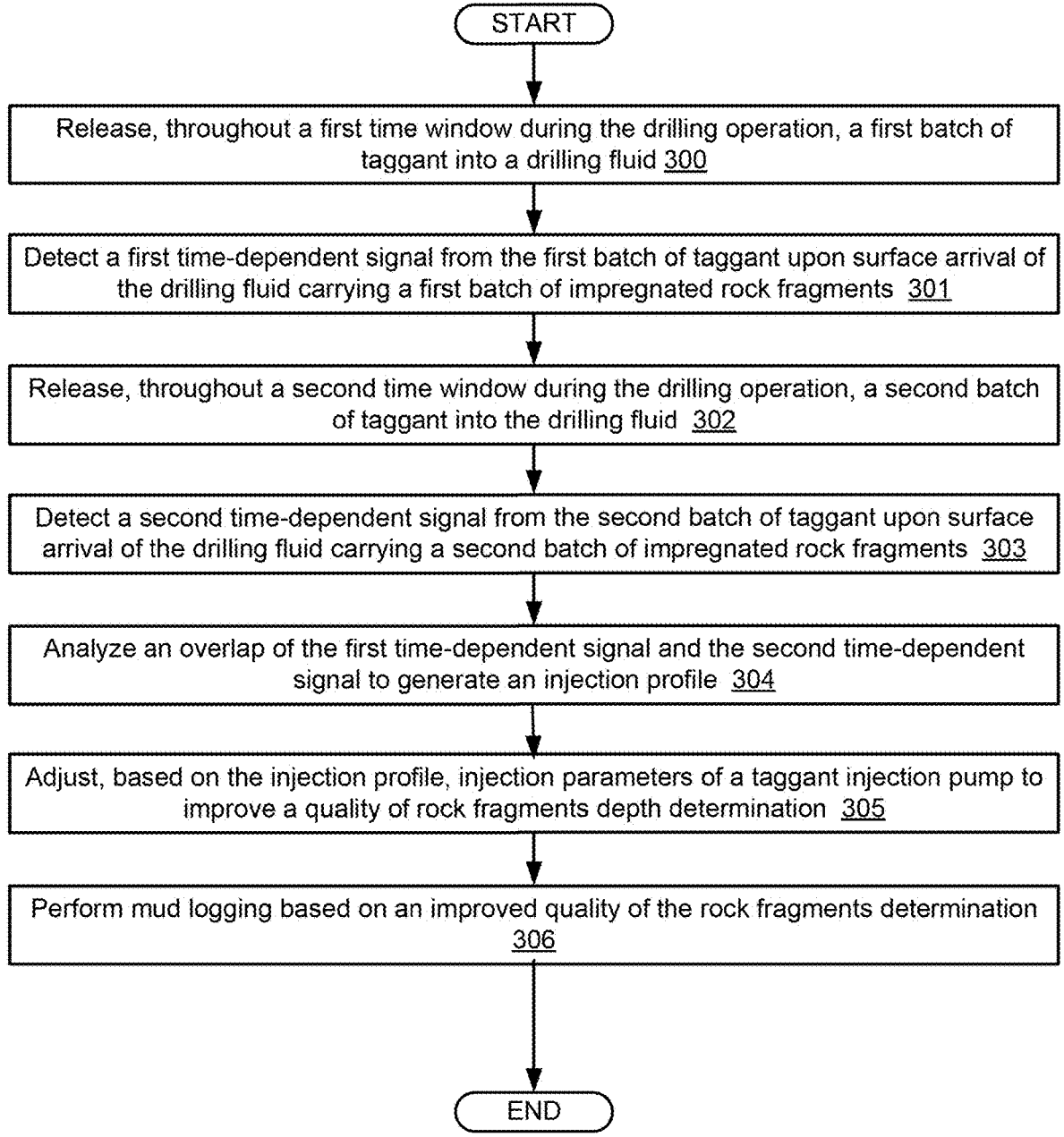
FIG. 3 shows a flowchart in accordance with one or more embodiments.

Turning to FIG. 3, FIG. 3 shows a method flowchart in accordance with one or more embodiments. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel and/or iteratively. Furthermore, the blocks may be performed actively or passively.

Initially in Block 300, using a taggant injection pump throughout a first time window during the drilling operation, a first batch of taggant is released into a drilling fluid. The first batch of taggant is injected according to a first injection profile. Generally, the injection profile specifies various injection parameters such as the quantity of taggant, the injection pressure of the taggant injection pump, the degree of shutting and opening of individual injector valves, the injection time window, the time separation from injecting the previous batch of taggant (i.e., injection time lag), etc. The first batch of taggant are transported downhole by the drilling fluid to impregnate a first batch of rock cuttings as the first batch of cuttings are produced by a drill bit. In one or more embodiments of the invention, the first batch of taggant include polymeric nanoparticles where each nanoparticle is encoded with an identification code unique to the first batch of taggant.

In Block 301, using a taggant detector at a surface location, a first time-dependent signal is detected from the first batch of taggant upon surface arrival of the first batch of rock cuttings. The taggant detector detects the first time-dependent signal from the first batch of taggant based on the optical, chemical, electrical, or mechanical characteristic of the nanoparticles in the taggant. The first batch of taggant are transported up-hole by the drilling fluid subsequent to impregnate the first batch of rock cuttings downhole. In one or more embodiments, the first time-dependent signal is identified as from the first batch of taggant based on detecting the identification code unique to the first batch of taggant. The first time-dependent signal has a magnitude that is proportional to the amount or concentration of taggant (e.g., polymeric nanoparticles) detected in the mud flow carrying the first batch of impregnated rock cuttings to the surface.

In Block 302, using the taggant injection pump throughout a second time window subsequent to the first time window during the drilling operation, a second batch of taggant is released into the drilling fluid. The second batch of taggant is injected according to a second injection profile. The second batch of taggant are transported downhole by the drilling fluid to impregnate a second batch of rock cuttings as the second batch of cuttings are produced by the drill bit. In one or more embodiments of the invention, the second batch of taggant include polymeric nanoparticles where each nanoparticle is encoded with an identification code unique to the second batch of taggant.

In Block 303, using the taggant detector at a surface location, a second time-dependent signal is detected from the second batch of taggant upon surface arrival of the second batch of rock cuttings. The taggant detector detects the second time-dependent signal from the second batch of taggant based on the optical, chemical, electrical, or mechanical characteristic of the nanoparticles in the taggant. The second batch of taggant are transported up-hole by the drilling fluid subsequent to impregnating the second batch of rock cuttings downhole. In one or more embodiments, the second time-dependent signal is identified as from the second batch of taggant based on detecting the identification code unique to the second batch of taggant. The second time-dependent signal has a magnitude that is proportional to the amount or concentration of taggant (e.g., polymeric nanoparticles) detected in the mud flow carrying the second batch of impregnated rock cuttings to the surface.

In Block 304, using a taggant analysis and control engine, an overlap of the first time-dependent signal and the second time-dependent signal is analyzed to generate a third injection profile. In one or more embodiments of the invention, the analysis includes one or more of determining respective signal peaks and half-widths of the first time-dependent signal and the second time-dependent signal, determining a time gap between the two signal peaks and a signal floor within the time gap, and determining other timing waveform statistics. The overlap is defined as a measure based on the respective signal peaks and half-widths, the time gap, the signal floor, and other timing waveform statistics. For example, the overlap may be defined as the ratio of the sum of the half-widths over the time gap. The overlap may be further qualified or modified by the ratio of one or both signal peak magnitude over the signal floor. The first time-dependent signal and the second time-dependent signal are determined to be distinguishable from each other, i.e., with minimum overlap, if each of the respective signal peaks exists and has a magnitude exceeding the signal floor by a predetermined threshold, such as 30% of the signal peak magnitude. The first time-dependent signal and the second time-dependent signal are determined to be not sufficiently distinguishable from each other if each of the respective signal peaks does not separately exist or if the overlap of the two time dependent signals exceeds a predetermined threshold.

In one or more embodiments, the third injection profile is substantially the same as the first or the second injection profile if the first time-dependent signal and the second time-dependent signal are determined to be distinguishable from each other. In one or more embodiments, the third injection profile is adjusted from the first or the second injection profile if the first time-dependent signal and the second time-dependent signal are determined to be not sufficiently distinguishable from each other. For example, the taggant quantity, injection pressure, and/or injection time lag of the third injection profile may be increased from those of the first and/or second injection profiles. In particular, the third injection profile is adjusted such that a third batch of taggant injected according to the third injection profile results in a third time dependent signal that is distinguishable from at least the second time dependent signal. In particular, the third time-dependent signal has a magnitude that is proportional to the amount or concentration of taggant (e.g., polymeric nanoparticles) detected in the mud flow carrying the third batch of impregnated rock cuttings to the surface.

In one or more embodiments, the third injection profile is generated using a machine learning model generated by the taggant analysis and control engine. The machine learning model is trained using a training data set that includes a large number of time dependent signals with corresponding injection profiles, as well as associated well site parameters for the drilling operation, such as mud properties, drill bit depth, rate of penetration, formation characteristics, etc. For example, the training data set may include the first injection profile and the second injection profile that yield the first time-dependent signal and the second time-dependent signal as distinguishable from each other and are marked as adequate injection profiles. In another example, the training data set may include the first injection profile and the second injection profile that yield the first time-dependent signal and the second time-dependent signal as not sufficiently distinguishable from each other and are marked as inadequate injection profiles. Accordingly, the third injection profile is generated using the trained machine learning model taking the well site parameters as inputs. In other words, the third injection profile is dependent on the mud properties, drill bit depth, rate of penetration, formation characteristics, etc. at the time of injecting the third batch of taggant. Specifically, such dependency is captured in and modeled by the machine learning model. As a result, a third batch of taggant injected according to the third injection profile yields a distinguishable third time dependent signal under the well site condition at the time of injecting the third batch of taggant. An example of generating the machine learning training data set is described in reference to FIGS. 4A and 4B below.

In Block 305, based on the third injection profile, the injection parameters of the taggant injection pump is adjusted to improve a quality of the rock cutting depth determination for mud logging. In one or more embodiments, the third injection profile is sent from the taggant analysis and control engine to an IoT controller. Accordingly, the IoT controller adjusts the injection parameters of the taggant injection pump based on the injection profile. In one or more embodiments, the taggant analysis and control engine resides on a Cloud server and the IoT controller resides in proximity to the taggant injection pump at the well site. In particular, the taggant analysis and control engine communicates with the IoT controller via a network connection (e.g., Internet) to send the injection profiles.

In Block 306, mud logging is performed based on the improved quality of rock cutting depth determination. For example, the mud logging is performed using the first, second, and third time dependent signals that are distinguishable from each other. During the mud logging, depth measurements of the drill bit are used to label rock properties of the first, second, and third batch of rock cuttings based on unique identification codes of the first, second, and third batch of taggant. An example of performing mud logging operation based on the improved quality of rock cutting depth determination is described in reference to FIGS. 4A and 4B below.

Figure 4A:
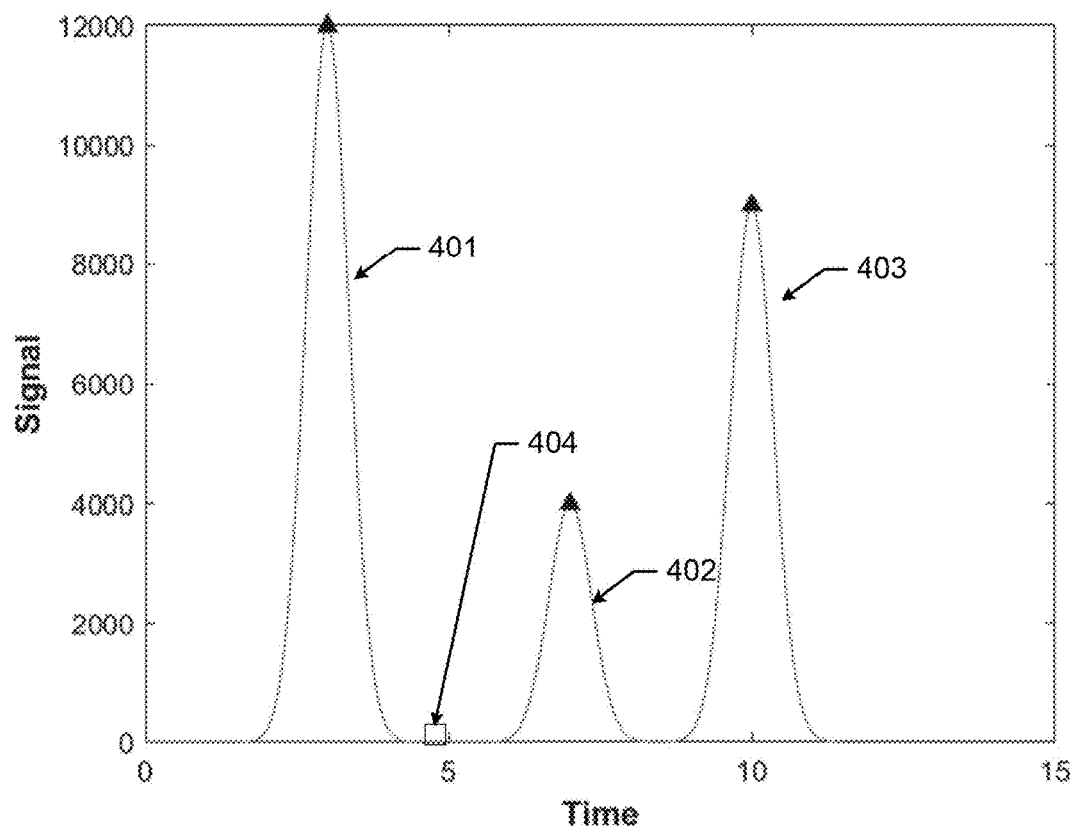
FIGS. 4A and 4B show an example in accordance with one or more embodiments.
Figure 4B:
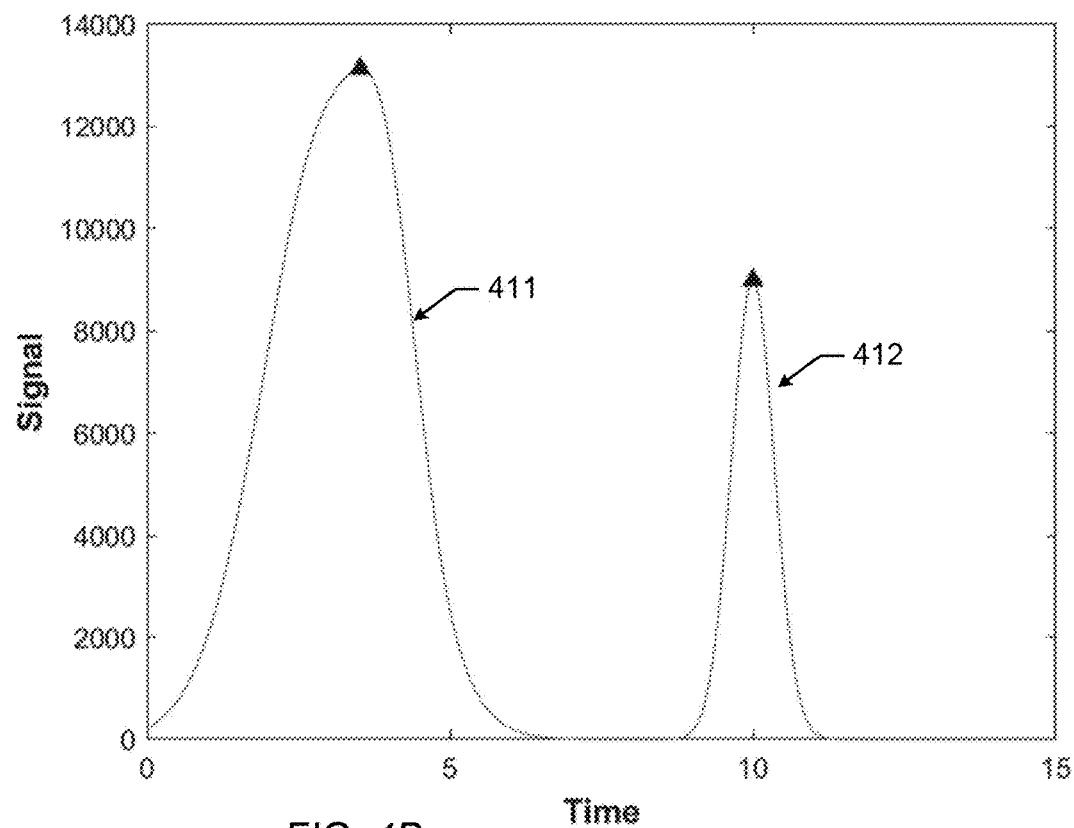

FIGS. 4A and 4B show an example in accordance with one or more embodiments. The example shown in FIGS. 4A and 4B is based on the system and method described in reference to FIGS. 1-3 above. In particular, FIGS. 4A and 4B show time dependent signals (401, 402, 403, 411, 412) detected from taggant impregnated rock cuttings carried back to the surface in the mud stream. In a first example application, the sequential time dependent signals (401, 402, 403, 411, 412) are used to determine rock cutting depths (i.e., depth of origin) during a mud logging operation. In a second example application, the time dependent signals (401, 402, 403, 411, 412) and corresponding injection parameters are part of the training data set to train a machine learning model used by the taggant analysis and control engine. Subsequent to the training phase, the machine learning model is used to generate injection profiles taking various parameters of the well site (e.g., mud properties, drill bit depth, rat of penetration, formation characteristics, etc.) as inputs. In the second example application, mud logging is performed using these machine learning model generated injection profiles to determine rock cutting depths.

As shown in FIG. 4A, the time dependent signal (401) corresponds to a first batch of taggant with a fixed quantity injected into the mud for a certain period during the drilling operation. The period depends on the flow rate, outflow and inflow from the annulus and drill string, as well as the mud properties and the depth/rate of penetration. The injection of the first batch of taggant continues until impregnated rock cuttings are detected and analyzed at the surface. When the time dependent time signal (401) indicates that an adequate percentage (e.g., 1 ppm) of rock cuttings are impregnated with the first batch of taggant, the impregnated rock cuttings are collected as the first analysis sample for mud logging of the first example application. t. At the same time, the depth of the drill bit is recorded as the rock cuttings' depth of origin. The first analysis sample is uniquely identified by the identification code encoded on each nanoparticle in the first batch of taggant. The rock properties of the first analysis sample are recorded with respect to the rock cutting's depth of origin, i.e., the depth of the drill bit at the time of detecting adequate percentage of impregnated rock cuttings with the first batch of taggant.

Subsequently, the second batch of taggant are injected into the drilling fluid to travel down the formation. For example, injection of the second batch of taggant may start upon detecting the adequate percentage of the impregnated rock cuttings with the first batch of taggant. The time dependent signal (402) corresponds to rock cuttings impregnated with the second batch of taggant. The injection rate may be similar at the beginning as for the first batch of taggant, however depending on the distinguishability between the time dependent signals (401) and (402), the injection rate of the second batch of taggant is automatically adjusted. If the time dependent signals (401) and (402) are distinguishable from each other, i.e., with minimum overlap, the injection of the second batch of taggant is gradually reduced until the time dependent signal (402) reaches a certain threshold. The time dependent signals (401) and (402) are said to be distinguishable from each other, i.e., with minimum overlap, if each of the respective signal peaks (denoted as solid triangles) exists and has a magnitude exceeding the signal floor (404) (denoted as an open square) by a predetermined threshold, such as 30% of the signal peak magnitude. In the first example application, when the time dependent time signal (402) indicates that an adequate percentage of the rock cuttings are impregnated with the second batch of taggant, the impregnated rock cuttings are collected as the second analysis sample for mud logging. The second analysis sample is uniquely identified by the identification code encoded on each nanoparticle in the second batch of taggant. The rock properties of the second analysis sample are recorded with respect to the rock cuttings' depth of origin, i.e., the depth of the drill bit at the time of detecting adequate percentage of impregnated rock cuttings with the second batch of taggant.

Subsequently, the third batch of taggant are injected into the drilling fluid to travel down the formation. For example, injection of the third batch of taggant may start upon detecting the adequate percentage of the impregnated rock cuttings with the second batch of taggant. The time dependent signal (403) corresponds to rock cuttings impregnated with the third batch of taggant. In the first example application, when the time dependent time signal (403) indicates that an adequate percentage of the rock cuttings are impregnated with the third batch of taggant, the impregnated rock cuttings are collected as the third analysis sample for mud logging. The third analysis sample is uniquely identified by the identification code encoded on each nanoparticle in the third batch of taggant. The rock properties of the third analysis sample are recorded with respect to the rock cuttings' depth of origin, i.e., the depth of the drill bit at the time of detecting adequate percentage of impregnated rock cuttings with the third batch of taggant.

As for the second example application, because the time dependent signals (401, 402, 403) all have distinct peaks with minimum overlap from each other, the injection profiles associated with the first batch, second batch, and third batch of taggant are marked as adequate in the machine learning training data set.

FIG. 4B shows the scenario if the distinction between time dependent signals of two consecutive batches of taggant is not strong enough. In other words, the time dependent signals of two consecutive batches of taggant are not sufficiently distinguishable from each other. Two time dependent signals are said to be not sufficiently distinguishable from each other if each of the respective signal peaks does not separately exist or if the overlap of the two time dependent signals exceeds a predetermined threshold. For example, the time dependent signal (411) corresponds to a combination of rock cuttings impregnated with two consecutive batches of taggant, while the time dependent signal (412) corresponds to rock cuttings impregnated with a later batch of taggant subsequent to injecting the two consecutive batches. The combination of rock cuttings associated with the time dependent signal (411) is discovered and/or confirmed by simultaneously detecting different identification codes of the first batch and second batch of taggant. In other words, the rock cuttings associated with the time dependent signal (411) include both rock cuttings impregnated with the first batch of taggant and rock cuttings impregnated with the second batch of taggant. In contrast to the scenario shown in FIG. 4A, the signal peak at time 7 is not visible as a separate signal peak. For the first example application, the rock cuttings associated with the time dependent signal (411) is not collected as any mud logging sample. Instead, the injection amount and/or injection pressure are increased for the later batch of taggant to yield the time dependent signal (412) as distinguishable from the time dependent signal (411). Accordingly, the rock cuttings associated with the time dependent signal (413) is collected as a mud logging sample. During the mud logging, the drill bit advances deeper into the formation corresponding to the sequence of time dependent signals (401, 402, 403, 411, 412) for determining rock cutting depths. The injection profile remains substantially unchanged and suitable for the first, second, and third batches of taggant at corresponding stages of drilling. Due to changes in drilling parameters and/or formation parameters, the injection profile becomes unsuitable when the drill bit advances beyond the first three recorded depths in the mud log and is adjusted in real time (i.e., during the drilling operation) based on the analysis result of the time dependent signals (401, 402 403, 411) such that the time dependent signal (412) is distinguishable from at least the time dependent signal (411) to continue the mud logging.

For the second example application, the rock cutting depths cannot be uniquely determined for the each of the two consecutive batches of taggant associated with the time dependent signal (411). Accordingly, the injection profiles of the two consecutive batches of taggant associated with the time dependent signal (411) are marked as inadequate in the machine learning training data set.

Example taggant injection parameters are listed in TABLE 1 below where Polybromostyrene/bromo nanoparticles (PBrST/BNP), polychlorostyrene chloro-nanoparticles (PCIST/CNP), Polymythylstyrene nanoparticles (MNP), Sodium dodecyl sulfate (SDS), and oil based mud (OBM) are used. For example, each row in TABLE 1 may correspond to one of the three batches of taggant described in FIG. 4A or one of the three batches of taggant described in FIG. 4B above.

TABLE 1

| No | NPs | Liquid | NPs concentration in OBM (ppm) | Injection time (min) | Injection volume (gallon) |
| --- | --- | --- | --- | --- | --- |
| 1 | PBrST/BNPs | SDS/water | 5.00 | 3 | 4.50 |
| 2 | PBrST/BNPs | SDS/water | 10.00 | 3 | 9.00 |
| 3 | PCIST/CNPs | SDS/water | 5.00 | 3 | 4.50 |
| 4 | PCIST/CNPs | SDS/water | 10.00 | 3 | 9.00 |
| 5 | MNPs | SDS/water | 5.00 | 3 | 4.50 |
| 6 | MNPs | SDS/water | 10.00 | 3 | 9.00 |

Figure 5A:
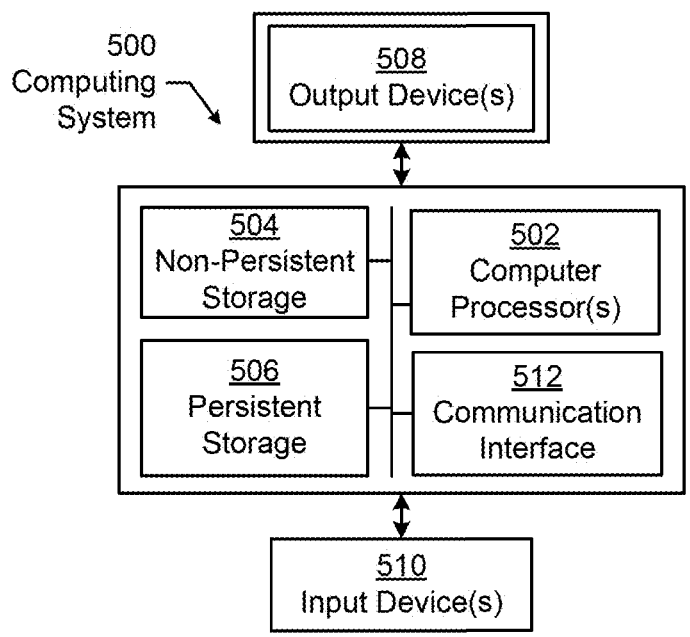
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
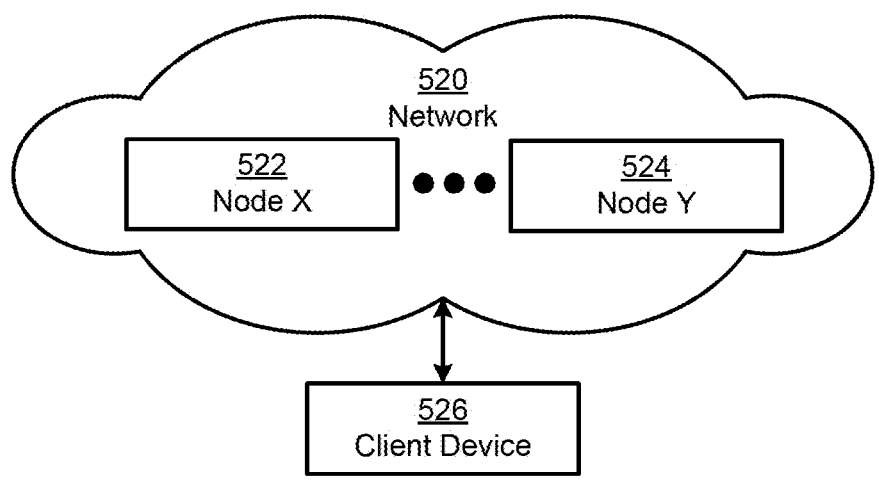

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for rock cutting depth determination during a drilling operation in a subterranean formation, the method comprising:
   releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit;
   detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings;
   releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit;
   detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings;
   analyzing, using a taggant analysis and control engine, an overlap of the first time-dependent signal and the second time-dependent signal with respect to injection parameters of the taggant injection pump during the first time period and the second time period to generate an injection profile; and
   adjusting, based on the injection profile, the injection parameters of the taggant injection pump to improve a quality of the rock cutting depth determination,
   wherein mud logging is performed based on an improved quality of the rock cutting depth determination.

2. The method of claim 1, further comprising:
   sending, from the taggant analysis and control engine to an Internet-of-Things (IoT) controller, the injection profile,
   wherein the IoT controller adjusts the injection parameters of the taggant injection pump based on the injection profile.

3. The method of claim 2, wherein the taggant analysis and control engine resides on a Cloud server that communicates with the IoT controller via a network connection.

4. The method of claim 1,
   wherein the injection profile specifies time dependent injection pressures throughout an injection period and a separation between adjacent injection periods, and
   wherein the injection parameters comprise a pressure and a degree of shutting and opening of individual injector valves connected to respective container chambers of the taggant injection pump.

5. The method of claim 4, wherein a first injection profile of the first batch of taggant and a second injection profile of the second batch of taggant are defined such that the first time-dependent signal and the second time-dependent signal are distinguishable from each other.

6. The method of claim 4,
   wherein the taggant analysis and control engine generates the injection profile based on a machine learning model,
   wherein the machine learning model is trained using at least the first injection profile and the second injection profile that yield the first time-dependent signal and the second time-dependent signal which are distinguishable from each other, and
   wherein inputs of the machine learning model comprise a drilling fluid parameter, a drilling parameter, and a formation parameter.

7. The method of claim 1, wherein the first batch of taggant and the second batch of taggant comprise polymeric nanoparticles that are encoded with respective identification codes.

8. A system for rock cutting depth determination, comprising:
   a computer processor; and
   memory storing instructions, when executed by the computer processor, comprising functionality for:
      releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit;
      detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings;
      releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit;

detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings;

analyzing, using a taggant analysis and control engine, an overlap of the first time-dependent signal and the second time-dependent signal with respect to injection parameters of the taggant injection pump during the first time period and the second time period to generate an injection profile; and adjusting, based on the injection profile, the injection parameters of the taggant injection pump to improve a quality of the rock cutting depth determination, wherein mud logging is performed based on an improved quality of the rock cutting depth determination.

9. The system of claim 8, the instructions, when executed by the computer processor, further comprising functionality for:

sending, from the taggant analysis and control engine to an Internet-of-Things (IoT) controller, the injection profile, wherein the IoT controller adjusts the injection parameters of the taggant injection pump based on the injection profile.

10. The system of claim 9, wherein the taggant analysis and control engine resides on a Cloud server that communicates with the IoT controller via a network connection.

11. The system of claim 8, wherein the injection profile specifies time dependent injection pressures throughout an injection period and a separation between adjacent injection periods, and wherein the injection parameters comprise a pressure and a degree of shutting and opening of individual injector valves connected to respective container chambers of the taggant injection pump.

12. The system of claim 11, wherein a first injection profile of the first batch of taggant and a second injection profile of the second batch of taggant are defined such that the first time-dependent signal and the second time-dependent signal are distinguishable from each other.

13. The system of claim 11, wherein the taggant analysis and control engine generates the injection profile based on a machine learning model, wherein the machine learning model is trained using at least the first injection profile and the second injection profile that yield the first time-dependent signal and the second time-dependent signal which are distinguishable from each other, and wherein inputs of the machine learning model comprise a drilling fluid parameter, a drilling parameter, and a formation parameter.

14. The system of claim 8, wherein the first batch of taggant and the second batch of taggant comprise polymeric nanoparticles that are encoded with respective identification codes.

15. A non-transitory computer readable medium storing instructions executable by a computer processor for rock cutting depth determination, the instructions, when executed, comprising functionality for:

releasing, using a taggant injection pump throughout a first time window during the drilling operation, a first batch of taggant into a drilling fluid, wherein the first batch of taggant are transported downhole by the drilling fluid to impregnate a first batch of rock cuttings as the first batch of cuttings are produced by a drill bit;

detecting, using a taggant detector at a surface location, a first time-dependent signal from the first batch of taggant upon surface arrival of the first batch of rock cuttings, wherein the first batch of taggant are transported up-hole by the drilling fluid subsequent to impregnating the first batch of rock cuttings;

releasing, using the taggant injection pump throughout a second time window during the drilling operation, a second batch of taggant into the drilling fluid, wherein the second batch of taggant are transported downhole by the drilling fluid to impregnate a second batch of rock cuttings as the second batch of cuttings are produced by drill bit;

detecting, using the taggant detector at the surface location, a second time-dependent signal from the second batch of taggant upon surface arrival of the second batch of rock cuttings, wherein the second batch of taggant are transported up-hole by the drilling fluid subsequent to impregnating the second batch of rock cuttings;

analyzing, using a taggant analysis and control engine, an overlap of the first time-dependent signal and the second time-dependent signal with respect to injection parameters of the taggant injection pump during the first time period and the second time period to generate an injection profile; and adjusting, based on the injection profile, the injection parameters of the taggant injection pump to improve a quality of the rock cutting depth determination, wherein mud logging is performed based on an improved quality of the rock cutting depth determination.

16. The non-transitory computer readable medium of claim 15, further comprising:

sending, from the taggant analysis and control engine to an Internet-of-Things (IoT) controller, the injection profile, wherein the IoT controller adjusts the injection parameters of the taggant injection pump based on the injection profile.

17. The non-transitory computer readable medium of claim 16, wherein the taggant analysis and control engine resides on a Cloud server that communicates with the IoT controller via a network connection.

18. The non-transitory computer readable medium of claim 15, wherein the injection profile specifies time dependent injection pressures throughout an injection period and a separation between adjacent injection periods, and wherein the injection parameters comprise a pressure and a degree of shutting and opening of individual injector valves connected to respective container chambers of the taggant injection pump.

19. The non-transitory computer readable medium of claim 18, wherein a first injection profile of the first batch of taggant and a second injection profile of the second batch of taggant are defined such that the first time-dependent signal and the second time-dependent signal are distinguishable from each other.

20. The non-transitory computer readable medium of claim 18, wherein the taggant analysis and control engine generates the injection profile based on a machine learning model, wherein the machine learning model is trained using at least the first injection profile and the second injection profile that yield the first time-dependent signal and the second time-dependent signal which are distinguishable from each other, and wherein inputs of the machine learning model comprise a drilling fluid parameter, a drilling parameter, and a formation parameter.

\* \* \* \* \*